(12) United States Patent
Zhang et al.

(10) Patent No.: US 12,706,460 B2
(45) Date of Patent: Aug. 11, 2026

(54) SINGLE-STAGE BIDIRECTIONAL DC CONVERTER AND SINGLE-PHASE USER-SIDE ENERGY STORAGE INVERTER BASED ON SINGLE-STAGE BIDIRECTIONAL DC CONVERTER

(71) Applicant: SHENZHEN GOSPELL DIGITAL TECHNOLOGY CO., LTD, Shenzhen (CN)

(72) Inventors: Shichun Zhang, Shenzhen (CN); Yonglin Long, Shenzhen (CN)

(73) Assignee: SHENZHEN GOSPELL DIGITAL TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 19/024,374

(22) Filed: Jan. 16, 2025

(65) Prior Publication Data

US 2026/0204910 A1 Jul. 16, 2026

(51) Int. Cl.

| | |
|---|---|
| ***H02M 3/335*** | (2006.01) |
| ***H02J 3/32*** | (2006.01) |
| ***H02J 3/38*** | (2006.01) |
| ***H02J 7/00*** | (2006.01) |
| ***H02J 7/35*** | (2006.01) |
| ***H02M 7/487*** | (2007.01) |
| ***H02M 7/797*** | (2006.01) |
| *H02J 101/24* | (2026.01) |

(52) U.S. Cl.

CPC ................ *H02J 3/32* (2013.01); *H02J 3/381* (2013.01); *H02J 7/35* (2013.01); *H02J 7/865* (2026.01); *H02M 7/487* (2013.01); *H02M 7/797* (2013.01); *H02J 2101/25* (2026.01); *H02J 2207/20* (2020.01)

(58) Field of Classification Search

CPC ............... H02J 3/32; H02J 3/381; H02J 3/388

See application file for complete search history.

(56) References Cited

U.S. PATENT DOCUMENTS

2006/0164024 A1* 7/2006 Ushijima ............. H05B 41/282 315/274
2016/0016479 A1* 1/2016 Khaligh .............. H02M 1/4258 336/170
2016/0233778 A1* 8/2016 Sanada ................ H02M 3/335

* cited by examiner

*Primary Examiner* — Menatoallah Youssef
*Assistant Examiner* — Esayas G Yeshaw
(74) *Attorney, Agent, or Firm* — Hemisphere Law, PLLC

(57) ABSTRACT

A single-stage bidirectional DC converter and a single-phase user-side energy storage inverter based on a single-stage bidirectional DC converter, which are used for bidirectional charge and discharge of a battery and energy storage for home users. A DC bus side of the converter is connected between photovoltaic MPPT and an inverter or connected to other loads, a low-voltage side of the converter is connected to a battery, and the converter has a simple topological structure and a few of components and reduces the equipment cost. A high-voltage side of the converter may be connected in series to a single-phase inverter circuit, a half-bridge inverter circuit, a three-phase inverter circuit, a three-phase and three-level inverter circuit or a split-phase inverter circuit, and the neutral-point voltage can be balanced to keep an output bus voltage stable, such that the application scenarios of the user-side energy storage inverter are expanded.

7 Claims, 4 Drawing Sheets

SINGLE-STAGE BIDIRECTIONAL DC CONVERTER AND SINGLE-PHASE USER-SIDE ENERGY STORAGE INVERTER BASED ON SINGLE-STAGE BIDIRECTIONAL DC CONVERTER

TECHNICAL FIELD

The invention relates to the technical field of bidirectional DC conversion, in particular to a single-stage bidirectional DC converter and a single-phase user-side energy storage inverter based on a single-stage bidirectional DC converter.

BACKGROUND

A user-side energy storage inverter (also referred to as home user-side energy storage inverter), the power of which is generally less than 30 kW and the energy of which ranges from several kilowatt-hours to dozens of kilowatt-hours, mainly functions as a backup power supply or functions for energy expense management, maximum utilization of photovoltaic power generation, etc.

In application of energy storage inverters, off-grid inverters and grid-connected and off-grid inverters, inversion based on an inverter bridge (H4) or Heric (H6) and maximum power point tracking (MPPT) from Boost to a bus are often adopted to realize battery charge with solar power or mains supply, conversion and grid-connected or off-grid output of solar power, conversion and grid-connected or off-grid output of batteries, and the like.

There are many topological structures for bidirectional DC conversion circuits. At present, an LLC+buck/boost topological structure is commonly used in the industry, or an LLC bidirectional conversion scheme is used in some low-cost application scenarios. The LLC+buck/boost topological structure has good performance, but the cost is high. The LLC scheme can realize related conversion, but the voltage is unstable.

In application of energy storage inverters, off-grid inverters and grid-connected and off-grid inverters, if a mains supply is available, power is obtained from a power grid and converted into a bus voltage, and then a battery is charged by bidirectional DC conversion. In application of LLC+buck/boost, control and regulation can be implemented easily by two-stage conversion to realize stable output of a bus voltage, which is beneficial to parallel output of inverters and MPPT. In application of LLC single-stage bidirectional conversion, to realize soft switching control, the performance of inverters will be limited in a case of battery charge, parallel output or grid-connected application due to the unstable bus voltage, and a circuit easily enters a protection state or even is damaged.

BRIEF SUMMARY OF THE INVENTION

In view of this, it is necessary to provide a single-stage bidirectional DC converter supporting bidirectional charge and discharge of a battery, and a single-phase user-side energy storage inverter based on a single-stage bidirectional DC converter.

A single-stage bidirectional DC converter is used for bidirectional charge and discharge of a battery and comprises a transformer T1, a bus-side circuit, a battery-side circuit and a controller, wherein the bus-side circuit is electrically connected to a primary side of the transformer T1, and the battery-side circuit is electrically connected to a secondary side of the transformer T1;

the bus-side circuit comprises at least one energy storage branch, each energy storage branch comprises a bus-side switching transistor, the battery-side circuit comprises a battery-side switching transistor, the controller is used for controlling on/off of the bus-side switching transistor and the battery-side switching transistor, and the battery-side switching transistor and the bus-side switching transistor are turned on and off complementarily.

Preferably, the energy storage branch comprises a first inductor L1, a third capacitor C3 and a first switching transistor Q1, the first inductor L1 and the third capacitor C3 are connected in series and then connected to a dotted terminal of a primary winding of the transformer T1, and a free terminal of the first inductor L1 is connected to a DC bus VBUS; a drain of the first switching transistor Q1 is connected to a midpoint between the first inductor L1 and the third capacitor C3, a source of the first switching transistor Q1 is connected to an undotted terminal of the primary winding of the transformer T1 and is grounded, and a first capacitor C1 is connected between the free terminal of the first inductor L1 and a ground wire;

the battery-side circuit comprises a second switching transistor Q2, a drain of the second switching transistor Q2 is connected to an undotted terminal of a secondary winding of the transformer T1, a source of the second switching transistor Q2 is grounded, a dotted terminal of the secondary winding of the transformer T1 is connected to a positive terminal VBAT of the battery, and a fifth capacitor C5 is connected between the dotted terminal of the secondary winding of the transformer T1 and the ground wire.

Moreover, a single-phase user-side energy storage inverter based on a single-stage bidirectional DC converter comprises the single-stage bidirectional DC converter described above and an inverter circuit connected to the single-stage bidirectional DC converter, wherein the bus-side circuit of the single-stage bidirectional DC converter comprises two energy storage branches, and the two energy storage branches are respectively connected to a positive terminal VBUS+ of the DC bus and a negative terminal VBUS− of the DC bus;

each energy storage branch comprises a bus-side switching transistor, the battery-side circuit comprises a battery-side switching transistor, the controller is used for controlling on/off of the bus-side switching transistors and the battery-side switching transistor, the bus-side switching transistors are turned on and off synchronously, and the battery-side switching transistor and the bus-side switching transistors are turned on and off complementarily.

Preferably, the two energy storage branches are a first energy storage branch and a second energy storage branch respectively, the first energy storage branch and the second energy storage branch are respectively connected to the dotted terminal and the undotted terminal of the primary winding of the transformer T1, and a center tap of the primary winding of the transformer T1 is grounded; the first energy storage branch comprises an inductor L1_A, a third capacitor C3 and a first switching transistor Q1, and the second energy storage branch comprises an inductor L1_B, a fourth capacitor C4 and a second switching transistor Q2;

the inductor L1_A and the third capacitor C3 are connected in series and then connected between the dotted terminal of the primary winding of the transformer T1 and the positive terminal VBUS+ of the DC bus, a drain of the first switching transistor Q1 is connected to a midpoint between the inductor L1_A and the third capacitor C3, and a source of the first switching transistor Q1 is connected to the center tap of the primary winding of the transformer T1 and is grounded;

the inductor L1_B and the fourth capacitor C4 are connected in series and then connected between the undotted terminal of the secondary winding of the transformer T1 and the negative terminal VBUS− of the DC bus, a source of the second switching transistor Q2 is connected to a midpoint between the inductor L1_B and the fourth capacitor C4, and a drain of the second switching transistor Q2 is connected to the center tap of the primary winding of the transformer T1 and is grounded;

a first capacitor C1 and a second capacitor C2 are respectively connected between the positive terminal VBUS+ of the DC bus and the center tap of the primary winding of the transformer T1 as well as between the negative terminal VBUS− of the DC bus and the center tap of the primary winding of the transformer T1.

Preferably, the battery-side circuit comprises a third switching transistor Q3, a drain of the third switching transistor Q3 is connected to the undotted terminal of the secondary winding of the transformer T1, a source of the third switching transistor Q3 is grounded, the dotted terminal of the secondary winding of the transformer T1 is connected to the positive terminal VBAT of the battery, and a fifth capacitor C5 is connected between the dotted terminal of the secondary winding of the transformer T1 and the ground wire.

Preferably, the inverter circuit is a single-phase inverter circuit, and the single-phase inverter circuit comprises a switching transistor Q4, a switching transistor Q5, a switching transistor Q7, a switching transistor Q8, an inductor L3 and an inductor L4;

the switching transistor Q4, the switching transistor Q5, the switching transistor Q7 and the switching transistor Q8 form two inverter bridges, which are connected between the positive terminal VBUS+ of the DC bus and the negative terminal VBUS− of the DC bus, and the inductor L3 and the inductor LA are respectively connected between arms of the two inverter bridges and input power lines V_L and V_N.

Preferably, the inverter circuit is a half-bridge inverter circuit, and the half-bridge inverter circuit comprises a capacitor C6, a capacitor C7, a switching transistor Q4, a switching transistor Q7, an inductor L3 and inductor L4;

the capacitor C6 and the capacitor C7 are connected in series and then connected between the positive terminal VBUS+ of the DC bus and the negative terminal VBUS− of the DC bus, the switching transistor Q4 and the switching transistor Q7 are connected in series and then connected between the positive terminal VBUS+ of the DC bus and the negative terminal VBUS− of the DC bus, two terminals of the inductor L4 are respectively connected to a midpoint between the capacitor C6 and the capacitor C7 and an input power line V_N, and two terminals of the L3 are respectively connected to a midpoint between the switching transistor Q4 and the switching transistor Q7 and an input power line V_L.

Preferably, the inverter circuit is a three-phase inverter circuit, and the three-phase inverter circuit comprises a fourth switching transistor Q4, a fifth switching transistor Q5, a sixth switching transistor Q6, a seventh switching transistor Q7, an eighth switching transistor Q8, a ninth switching transistor Q9, a third inductor L3, a fourth inductor L4 and a fifth inductor L5;

the fifth switching transistor Q5, the sixth switching transistor Q6, the seventh switching transistor Q7, the eighth switching transistor Q8 and the ninth switching transistor Q9 form three inverter bridges, which are connected in parallel between the positive terminal VBUS+ of the DC bus and the negative terminal VBUS− of the DC bus, and the inductor L3, the inductor L4 and the inductor L5 are respectively connected between arms of the three inverter bridges and input power lines VA, VB and VC.

Preferably, the inverter circuit is a three-phase and three-level inverter circuit, the three-phase and three-level inverter circuit comprises three three-level inverter branches which are connected in parallel, and a phase difference between the three three-level inverter branches is 120°; each three-level inverter branch comprises a T-type three-level inverter, a first inverter inductor and a first output capacitor, the T-type three-level inverter comprises a first switching unit, a second switching unit and a third switching unit which are connected in a T shape, the first switching unit and the second switching unit are connected in series and then connected between the positive terminal VBUS+ of the DC bust and the negative terminal VBUS− of the DC bus, the third switching unit is connected between a center tap of the transformer T1 and a midpoint between the first switching unit and the second switching unit, the midpoint between the first switching unit and the second switching unit is connected to a first output terminal by means of the first inverter inductor, and a second output terminal is connected to the negative terminal VBUS− of the DC bus;

wherein, the third switching unit comprises a pair of switching transistors which are connected back-to-back;

the first output capacitor is connected between the first output terminal and the second output terminal.

Preferably, the inverter circuit is a split-phase inverter circuit, the split-phase inverter circuit comprises two split-phase inverter branches which are connected in parallel back-to-back, and a preset phase difference is set between the two split-phase inverter branches; each split-phase inverter branch comprises a split-phase inverter, a second inverter inductor and a second output capacitor, the split-phase inverter comprises a fourth switching unit, a fifth switching unit and a sixth switching unit which are connected in a T shape, the fourth switching unit and the fifth switching unit are connected in series and then connected between the positive terminal VBUS+ of the DC bus and the negative terminal VBUS− of the DC bus, the sixth switching unit is connected between a center tap of the transformer T1 and a midpoint between the fourth switching unit and the fifth switching unit, the midpoint between the fourth switching unit and the fifth switching unit is connected to a first output terminal by means of the second inverter inductor, and a second output terminal is connected to the negative terminal VBUS− of the DC bus;

wherein, the sixth switching unit comprises a pair of switching transistors which are connected back-to-back;

the second output capacitor is connected between the first output terminal and the second output terminal.

According to the single-stage bidirectional DC converter and the single-phase user-side energy storage inverter based on a single-stage bidirectional DC converter, a DC bus side of the single-stage bidirectional DC converter is connected between photovoltaic MPPT and an inverter or connected to other loads, a low-voltage side of the single-stage bidirectional DC converter is connected to a battery, and the single-stage bidirectional DC converter has a simple topological structure and a few of components and reduces the equipment cost. A high-voltage side of the single-stage bidirectional DC converter may be connected in series to a single-phase inverter circuit, a half-bridge inverter circuit, a three-phase inverter circuit, a three-phase and three-level inverter circuit or a split-phase inverter circuit, and the neutral-point voltage can be balanced to keep an output bus voltage stable, such that the application scenarios of the user-side energy storage inverter are expanded. The circuit structure in the invention is easy to implement, low in cost and easy to popularize.

DETAILED DESCRIPTION OF THE INVENTION

A single-stage bidirectional DC converter and a single-phase user-side energy storage inverter based on a single-stage bidirectional DC converter provided by the invention are described in detail below by way of examples in conjunction with specific embodiments and accompanying drawings.

Embodiment 1

Figure 1:
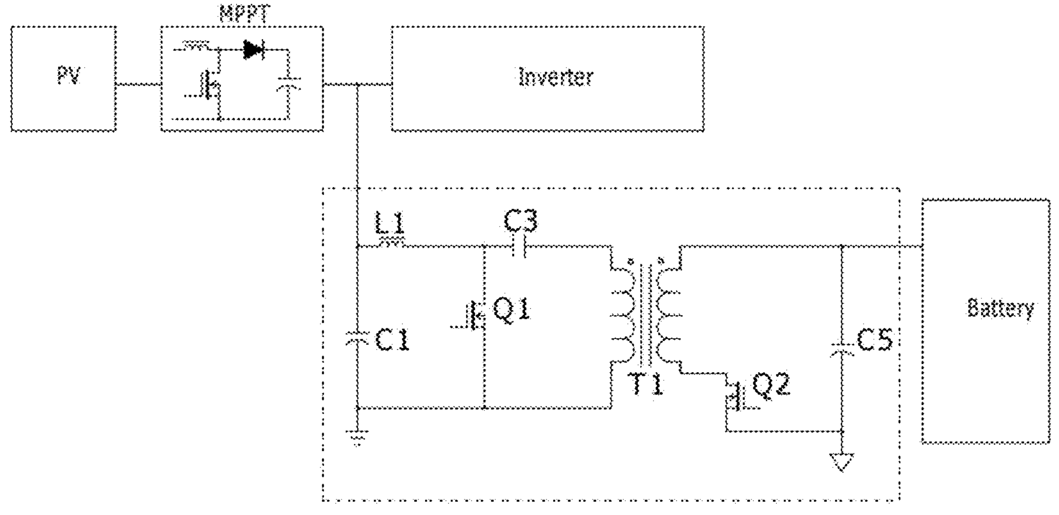
FIG. 1 is a first structural diagram of a single-stage bidirectional DC converter according to Embodiment 1 of the invention.

Referring to FIG. 1 which illustrates a single-stage bidirectional DC converter according to Embodiment 1 of the invention, the single-stage bidirectional DC converter is used for bidirectional charge and discharge of a battery and comprises a transformer T1, a bus-side circuit, a battery-side circuit and a controller, wherein the bus-side circuit is electrically connected to a primary side of the transformer T1, and the battery-side circuit is electrically connected to a secondary side of the transformer T1;

the bus-side circuit comprises at least one energy storage branch, each energy storage branch comprises a bus-side switching transistor, the battery-side circuit comprises a battery-side switching transistor, the controller is used for controlling on/off of the bus-side switching transistor and the battery-side switching transistor, and the battery-side switching transistor and the bus-side switching transistor are turned on and off complementarily.

Specifically, the single-stage bidirectional DC converter is connected to a power transmission and transformation network, wherein the bus-side circuit is connected between MPPT and an inverter, the battery-side circuit is connected to an energy storage battery, and the single-stage bidirectional DC converter is used for controlling bidirectional energy transmission between the power transmission and transformation network and the energy storage battery.

Preferably, the energy storage branch comprises a first inductor L1, a third capacitor C3 and a first switching transistor Q1, the first inductor L1 and the third capacitor C3 are connected in series and then connected to a dotted terminal of a primary winding of the transformer T1, and a free terminal of the first inductor L1 is connected to a DC bus VBUS; a drain of the first switching transistor Q1 is connected to a midpoint between the first inductor L1 and the third capacitor C3, a source of the first switching transistor Q1 is connected to an undotted terminal of the primary winding of the transformer T1 and is grounded, and a first capacitor C1 is connected between the free terminal of the first inductor L1 and a ground wire.

The battery-side circuit comprises a second switching transistor Q2, a drain of the second switching transistor Q2 is connected to an undotted terminal of a secondary winding of the transformer T1, a source of the second switching transistor Q2 is grounded, a dotted terminal of the secondary winding of the transformer T1 is connected to a positive terminal VBAT of the battery, and a fifth capacitor C5 is connected between the dotted terminal of the secondary winding of the transformer T1 and the ground wire.

Preferably, the bus-side switching transistor and the battery-side switching transistor are MOSFETs, IGBTs, or bipolar triodes or diodes.

Specifically, when the battery is charged, the single-stage bidirectional DC converter works forward. When the first switching transistor Q1 is turned on, the second switching transistor Q2 is turned off, the first inductor L1 stores energy by means of the first switching transistor Q1, and the first transformer T1 and the third capacitor C3 are reset. When the first switching transistor Q1 is turned off, the second switching transistor Q2 is turned on, energy in the first inductor L1 is transmitted to a battery side by means of the third capacitor C3 and the first transformer T1 to charge the battery.

When the battery discharges, the single-stage bidirectional DC converter works reversely. When the second switching transistor Q2 is turned on, the first switching transistor Q1 is turned off, energy of the battery is transmitted to a power bus side by means of the first transformer T1 and the third capacitor C3, and the first inductor L1 stores energy. When the second switching transistor Q2 is turned off, the first switching transistor Q1 is turned on, the first inductor L1 resumes the current to release energy to the DC bus VBUS, and the third capacitor C3 and the first transformer T1 are reset.

Figure 2:
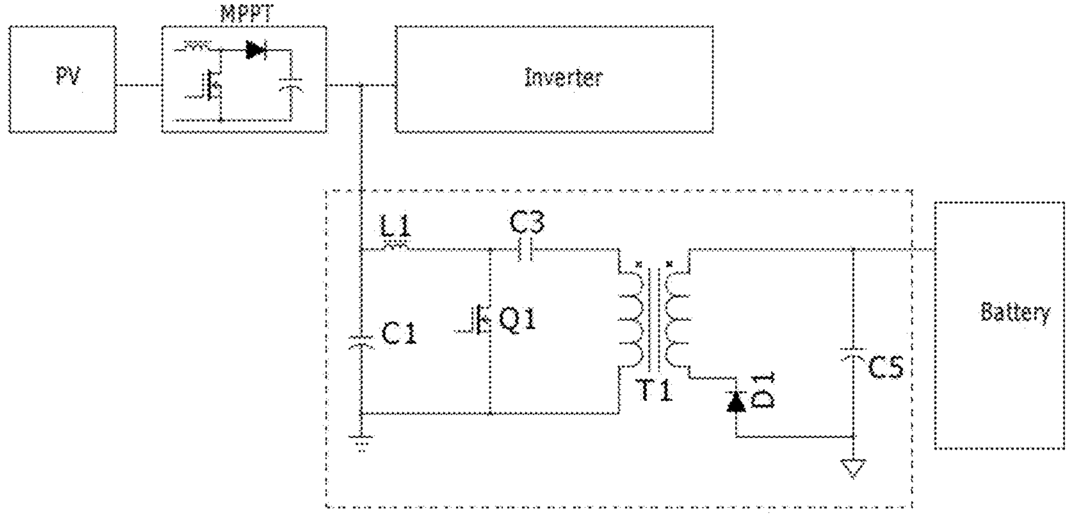
FIG. 2 is a second structural diagram of the single-stage bidirectional DC converter according to Embodiment 1 of the invention.
Figure 3:
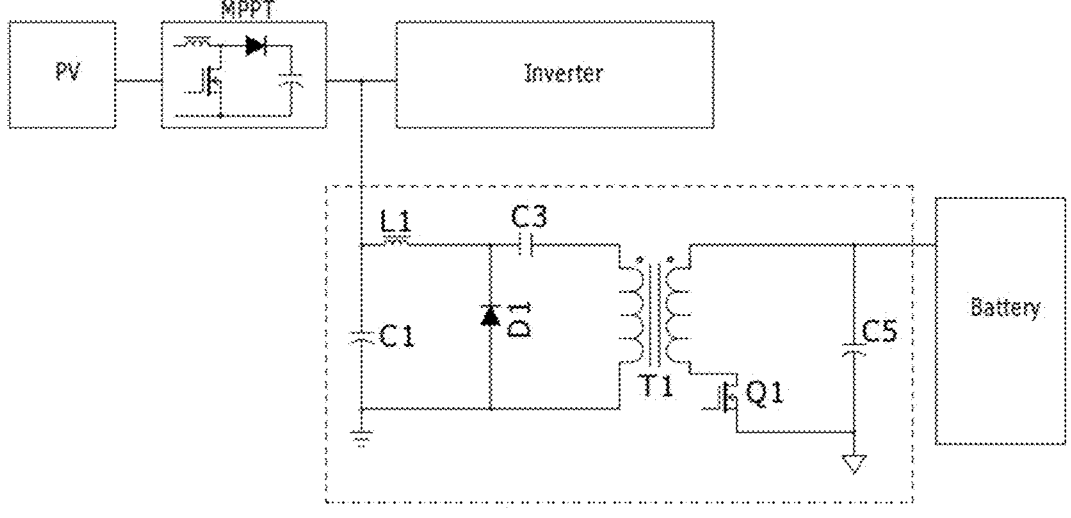
FIG. 3 is a third structural diagram of the single-stage bidirectional DC converter according to Embodiment 1 of the invention.

In this embodiment, the first switching transistor Q1 and the second switching transistor Q2 are components with switching performance such as MOSFETs, IGBTs, or bipolar triodes or diodes. Wherein, in FIG. 2, the first switching transistor Q1 is a diode; in FIG. 3, the second switching transistor Q2 is a diode.

Embodiment 2

Figure 4:
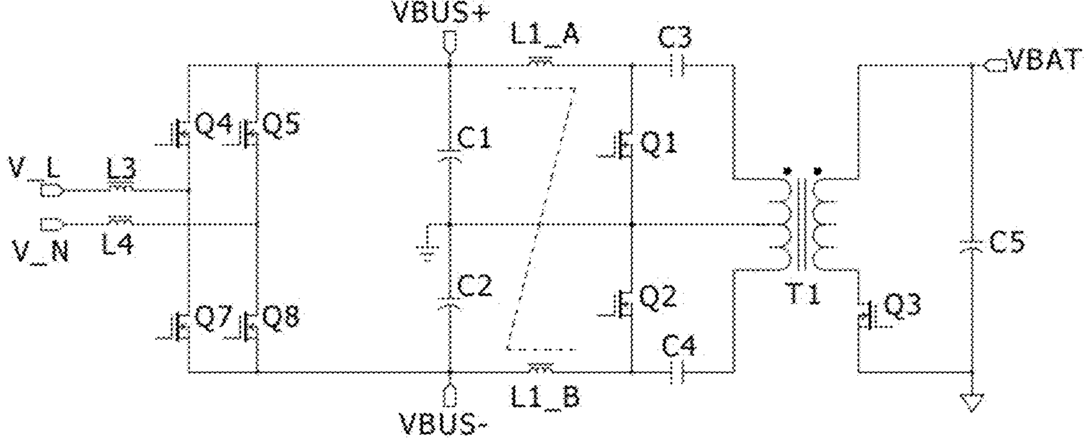
FIG. 4 is a schematic diagram of a circuit structure of a single-phase user-side energy storage inverter based on a single-stage bidirectional DC converter (single-phase inverter circuit) according to Embodiment 2 of the invention.

Referring to FIG. 4 which illustrates a single-phase user-side energy storage inverter based on a single-stage bidirectional DC converter according to Embodiment 2 of the invention, the single-phase user-side energy storage inverter is used for energy storage for home users and comprises a single-stage bidirectional DC converter and an inverter circuit connected to the single-stage bidirectional DC converter, wherein inverter circuit is connected in series to a bus side of the single-stage bidirectional DC converter to realize indoor power supply for the home users.

The single-stage bidirectional DC converter comprises a transformer T1, a bus-side circuit, a battery-side circuit and a controller, wherein the bus-side circuit is electrically connected to a primary side of the transformer T1, and the battery-side circuit is electrically connected to a secondary side of the transformer T1.

The bus-side circuit comprises two energy storage branches, and the two energy storage branches are respectively connected to a positive terminal VBUS+ of a DC bus and a negative terminal VBUS− of the DC bus; each energy storage branch comprises a bus-side switching transistor, the battery-side circuit comprises a battery-side switching transistor, the controller is used for controlling on/off of the bus-side switching transistors and the battery-side switching transistor, the bus-side switching transistors are turned on and off synchronously, and the battery-side switching transistor and the bus-side switching transistors are turned on and off complementarily.

Preferably, the two energy storage branches are a first energy storage branch and a second energy storage branch respectively, the first energy storage branch and the second energy storage branch are respectively connected to a dotted terminal and an undotted terminal of a primary winding of the transformer T1, and a center tap of the primary winding of the transformer T1 is grounded; the first energy storage branch comprises an inductor L1_A, a third capacitor C3 and a first switching transistor Q1, and the second energy storage branch comprises an inductor L1_B, a fourth capacitor C4 and a second switching transistor Q2;

the inductor L1_A and the third capacitor C3 are connected in series and then connected between the dotted terminal of the primary winding of the transformer T1 and the positive terminal VBUS+ of the DC bus, a drain of the first switching transistor Q1 is connected to a midpoint between the inductor L1_A and the third capacitor C3, and a source of the first switching transistor Q1 is connected to the center tap of the primary winding of the transformer T1 and is grounded;

the inductor L1_B and the fourth capacitor C4 are connected in series and then connected between an undotted terminal of a secondary winding of the transformer T1 and the negative terminal VBUS− of the DC bus, a source of the second switching transistor Q2 is connected to a midpoint between the inductor L1_B and the fourth capacitor C4, and a drain of the second switching transistor Q2 is connected to the center tap of the primary winding of the transformer T1 and is grounded;

a first capacitor C1 and a second capacitor C2 are respectively connected between the positive terminal VBUS+ of the DC bus and the center tap of the primary winding of the transformer T1 as well as between the negative terminal VBUS− of the DC bus and the center tap of the primary winding of the transformer T1.

Specifically, the inductor L1_A and the inductor L1_B are coupled inductors or non-coupled inductors.

Preferably, the battery-side circuit comprises a third switching transistor Q3, a drain of the third switching transistor Q3 is connected to the undotted terminal of the secondary winding of the transformer T1, a source of the third switching transistor Q3 is grounded, a dotted terminal of the secondary winding of the transformer T1 is connected to a positive terminal VBAT of a battery, and a fifth capacitor C5 is connected between the dotted terminal of the secondary winding of the transformer T1 and a ground wire.

In this embodiment, the inverter circuit is a single-phase inverter circuit, and the single-phase inverter circuit comprises a switching transistor Q4, a switching transistor Q5, a switching transistor Q7, a switching transistor Q8, an inductor L3 and an inductor L4;

the switching transistor Q4, the switching transistor Q5, the switching transistor Q7 and the switching transistor Q8 form two inverter bridges, which are connected between the positive terminal VBUS+ of the DC bus and the negative terminal VBUS− of the DC bus, and the inductor L3 and the inductor L4 are respectively connected between arms of the two inverter bridges and input power lines V_L and V_N.

Specifically, the single-phase inverter circuit may be connected to a single-bus bidirectional DC converter or a double-bus bidirectional DC converter. In a case where the single-phase inverter circuit is connected to the single-bus bidirectional DC converter, the negative terminal VBUS− of the DC bus is equivalent to the ground wire.

Embodiment 3

Figure 5:
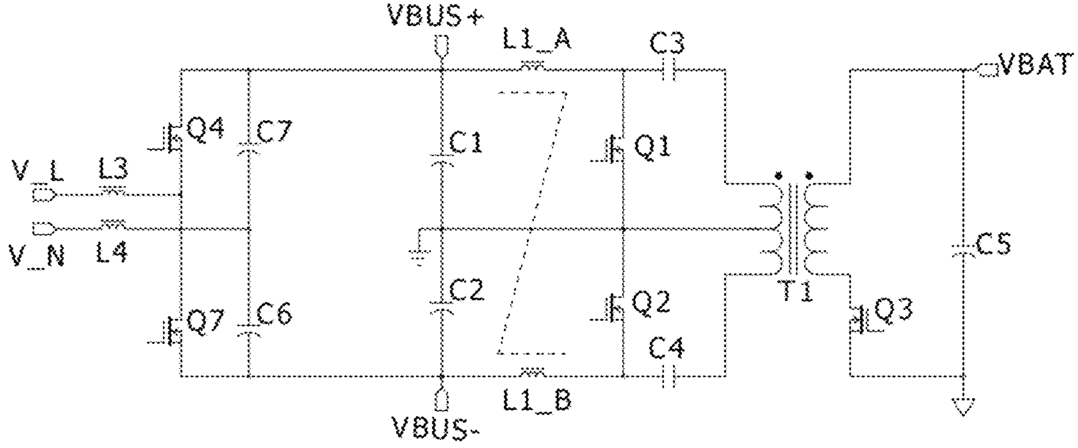
FIG. 5 is a schematic diagram of a circuit structure of a single-phase user-side energy storage inverter based on a single-stage bidirectional DC converter (half-bridge inverter circuit) according to Embodiment 3 of the invention.

Referring to FIG. 5 which illustrates a single-phase user-side energy storage inverter based on a single-stage bidirectional DC converter according to Embodiment 3 of the invention, the single-phase user-side energy storage inverter comprises a single-stage bidirectional DC converter and an inverter circuit connected to the single-stage bidirectional DC converter, wherein the inverter circuit is connected in series to a bus side of the single-stage bidirectional DC converter. The circuit structure of the single-stage bidirectional DC converter in this embodiment is identical with the circuit structure of the single-stage bidirectional DC converter in Embodiment 2 and will not be repeated here.

In this embodiment, the inverter circuit is a half-bridge inverter circuit, and the half-bridge inverter circuit comprises a capacitor C6, a capacitor C7, a switching transistor Q4, a switching transistor Q7, an inductor L3 and inductor L4;

the capacitor C6 and the capacitor C7 are connected in series and then connected between the positive terminal VBUS+ of the DC bus and the negative terminal VBUS− of the DC bus, the switching transistor Q4 and the switching transistor Q7 are connected in series and then connected between the positive terminal VBUS+ of the DC bus and the negative terminal VBUS− of the DC bus, two terminals of the inductor L4 are respectively connected to a midpoint between the capacitor C6 and the capacitor C7 and an input power line V_N, and two terminals of the L3 are respectively connected to a midpoint between the switching transistor Q4 and the switching transistor Q7 and an input power line V_L.

Embodiment 4

Figure 6:
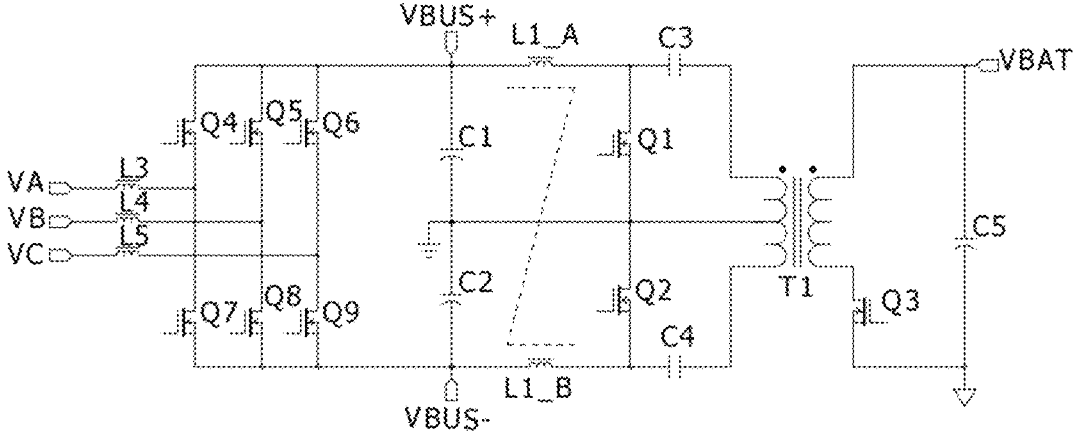
FIG. 6 is a schematic diagram of a circuit structure of a single-phase user-side energy storage inverter based on a single-stage bidirectional DC converter (three-phase inverter circuit) according to Embodiment 4 of the invention.

Referring to FIG. 6 which illustrates a single-phase user-side energy storage inverter based on a single-stage bidirectional DC converter according to Embodiment 4 of the invention, the single-phase user-side energy storage inverter comprises a single-stage bidirectional DC converter and an inverter circuit connected to the single-stage bidirectional DC converter, wherein the inverter circuit is connected in series to a bus side of the single-stage bidirectional DC converter. The circuit structure of the single-stage bidirectional DC converter in this embodiment is identical with the circuit structure of the single-stage bidirectional DC converter in Embodiment 2 and will not be repeated here.

In this embodiment, the inverter circuit is a three-phase inverter circuit, and the three-phase inverter circuit comprises a fourth switching transistor Q4, a fifth switching transistor Q5, a sixth switching transistor Q6, a seventh switching transistor Q7, an eighth switching transistor Q8, a ninth switching transistor Q9, a third inductor L3, a fourth inductor L4 and a fifth inductor L5;

The fourth switching transistor Q4, the fifth switching transistor Q5, the sixth switching transistor Q6, the seventh switching transistor Q7, the eighth switching transistor Q8 and the ninth switching transistor Q9 form three inverter bridges, which are connected in parallel between the positive terminal VBUS+ of the DC bus and the negative terminal VBUS− of the DC bus, and the inductor L3, the inductor L4 and the inductor L5 are respectively connected between arms of the three inverter bridges and input power lines VA, VB and VC.

Embodiment 5

Figure 7:
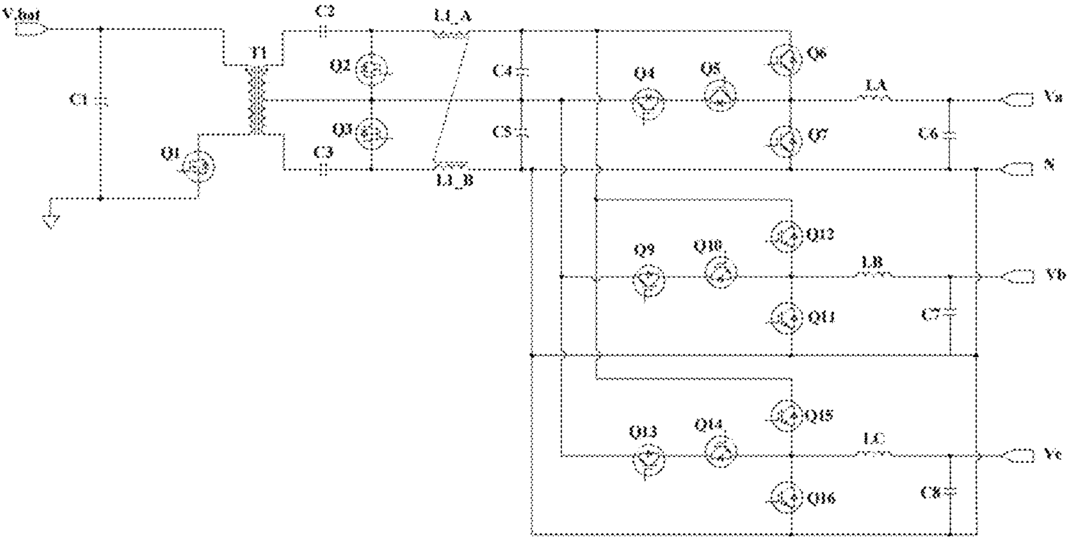
FIG. 7 is a schematic diagram of a circuit structure of a single-phase user-side energy storage inverter based on a single-stage bidirectional DC converter (three-phase and three-level inverter circuit) according to Embodiment 5 of the invention.

Referring to FIG. 7 which illustrates a single-phase user-side energy storage inverter based on a single-stage bidirectional DC converter according to Embodiment 5 of the invention, the single-phase user-side energy storage inverter comprises a single-stage bidirectional DC converter and an inverter circuit connected to the single-stage bidirectional DC converter, wherein the inverter circuit is connected in series to a bus side of the single-stage bidirectional DC converter. The circuit structure of the single-stage bidirectional DC converter in this embodiment is identical with the circuit structure of the single-stage bidirectional DC converter in Embodiment 2 and will not be repeated here.

In this embodiment, the inverter circuit is a three-phase and three-level inverter circuit, the three-phase and three-level inverter circuit comprises three three-level inverter branches which are connected in parallel, and a phase difference between the three three-level inverter branches is 120°; each three-level inverter branch comprises a T-type three-level inverter, a first inverter inductor and a first output capacitor, the T-type three-level inverter comprises a first switching unit, a second switching unit and a third switching unit which are connected in a T shape, the first switching unit and the second switching unit are connected in series and then connected between the positive terminal VBUS+ of the DC bust and the negative terminal VBUS− of the DC bus, the third switching unit is connected between a center tap of the transformer T1 and a midpoint between the first switching unit and the second switching unit, the midpoint between the first switching unit and the second switching unit is connected to a first output terminal by means of the first inverter inductor, and a second output terminal is connected to the negative terminal VBUS− of the DC bus;

wherein, the third switching unit comprises a pair of switching transistors which are connected back-to-back;

the first output capacitor is connected between the first output terminal and the second output terminal.

Specifically, first AC output terminals of the three three-level inverter branches are out-of-phase output terminals Va, Vb and Vc respectively, and second AC output terminals of the three three-level inverter branches form a common terminal N of the three three-level inverter branches.

Specifically, in this embodiment, in a first three-level inverter branch, the first switching unit is a switching transistor Q6, the second switching unit is a switching transistor Q7, the third switching unit comprises a switching transistor Q4 and a switching transistor Q5 which are connected back-to-back, the first inverter inductor is an inductor LA, and the first output capacitor is a capacitor C6; the switching transistor Q4, the switching transistor Q5, the switching transistor Q6 and the switching transistor Q7 form the T-type three-level inverter, the T-type three-level inverter is connected to the output terminal Va by means of the inductor LA, and the capacitor C6 is connected between the output terminal Va and the common terminal N.

In a second three-level inverter branch, the first switching unit is a switching transistor Q12, the second switching unit is a switching transistor Q11, the third switching unit comprises a switching transistor Q9 and a switching transistor Q10 which are connected back-to-back, the first inverter inductor is an inductor LB, and the first output capacitor is a capacitor C7; the switching transistor Q9, the switching transistor Q10, the switching transistor Q11 and the switching transistor Q12 form the T-type three-level inverter, the T-type three-level inverter is connected to the output terminal Vb by means of the inductor LB, and the capacitor C7 is connected between the output terminal Vb and the common terminal N.

In a third three-level inverter branch, the first switching unit is a switching transistor Q15, the second switching unit is a switching transistor Q16, the third switching unit comprises a switching transistor Q13 and a switching transistor Q14 which are connected back-to-back, the first inverter inductor is an inductor LC, and the first output capacitor is a capacitor C8; the switching transistor Q13, the switching transistor Q14, the switching transistor Q15 and the switching transistor Q16 form the T-type three-level inverter, the T-type three-level inverter is connected to the output terminal Vc by means of the inductor LC, and the capacitor C8 is connected between the output terminal Vc and the common terminal N.

Specifically, in this embodiment, the capacitor C4 and the capacitor C5 are respectively connected between the positive terminal VBUS+ of the DC bus and the center tap of the transformer T1 as well as between the negative terminal VBUS− of the DC bus and the center tap of the transformer T1. When an upper half and a lower half of the inverter are out of balance, the voltage of the capacitor C4 will be unequal to the voltage of the capacitor C5. For example, in a case where the voltage of the capacitor C4 is higher than the voltage of the capacitor C5, because two secondary windings, connected to the capacitor C4 and the capacitor C5, of the transformer T1 are located on the same magnetic core and have the same number of turns, voltages of the two windings are equal; because the switching transistor Q2 and the switching transistor Q3 are turned on and off synchronously and the switching transistor Q1 and the switching transistors Q2 and Q3 are turned on and off complementarily, energy flows back to the capacitor C5 from the capacitor C4 by means of an inductor L1_A, a capacitor C2, the secondary windings of the transformer T1, a capacitor C3 and an inductor L1_B to dynamically keep the voltage of the capacitor C4 equal to the voltage of the capacitor C5, such that voltages of the output terminals of the inverter are balanced.

Embodiment 6

Figure 8:
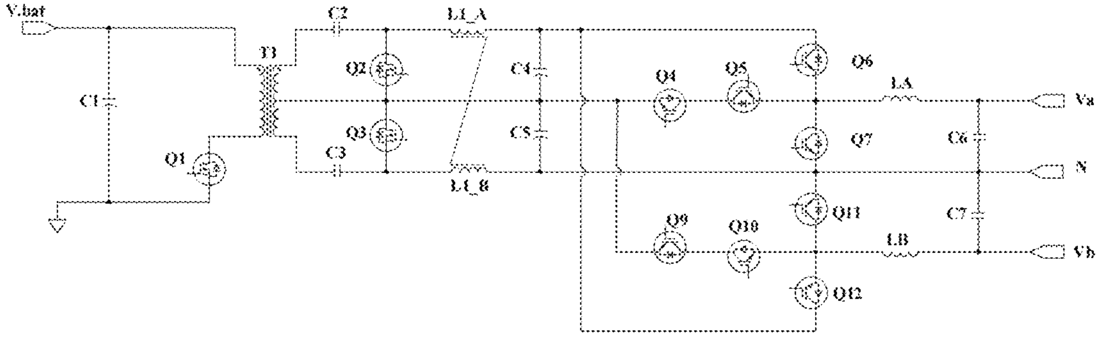
FIG. 8 is a schematic diagram of a circuit structure of a single-phase user-side energy storage inverter based on a single-stage bidirectional DC converter (split-phase inverter circuit) according to Embodiment 6 of the invention.

Referring to FIG. 8 which illustrates a single-phase user-side energy storage inverter based on a single-stage bidirectional DC converter according to Embodiment 6 of the invention, the single-phase user-side energy storage inverter comprises a single-stage bidirectional DC converter and an inverter circuit connected to the single-stage bidirectional DC converter, wherein the inverter circuit is connected in series to a bus side of the single-stage bidirectional DC converter. The circuit structure of the single-stage bidirectional DC converter in this embodiment is identical with the circuit structure of the single-stage bidirectional DC converter in Embodiment 2 and will not be repeated here.

In this embodiment, the inverter circuit is a split-phase inverter circuit, the split-phase inverter circuit comprises two split-phase inverter branches which are connected in parallel back-to-back, and a preset phase difference is set between the two split-phase inverter branches; each split-phase inverter branch comprises a split-phase inverter, a second inverter inductor and a second output capacitor, the split-phase inverter comprises a fourth switching unit, a fifth switching unit and a sixth switching unit which are connected in a T shape, the fourth switching unit and the fifth switching unit are connected in series and then connected between the positive terminal VBUS+ of the DC bus and the negative terminal VBUS− of the DC bus, the sixth switching unit is connected between a center tap of the transformer T1 and a midpoint between the fourth switching unit and the fifth switching unit, the midpoint between the fourth switching unit and the fifth switching unit is connected to a first output terminal by means of the second inverter inductor, and a second output terminal is connected to the negative terminal VBUS− of the DC bus;

wherein, the sixth switching unit comprises a pair of switching transistors which are connected back-to-back;

the second output capacitor is connected between the first output terminal and the second output terminal.

Specifically, first AC output terminals of the two split-phase inverter branches are out-of-phase output terminals Va and Vb respectively, and second AC output terminals of the two split-phase inverter branches form a common terminal N of the two split-phase inverter branches.

Specifically, in this embodiment, in a first split-phase inverter branch, the fourth switching unit is a switching transistor Q6, the fifth switching unit is a switching transistor Q7, the sixth switching unit comprises a switching transistor Q4 and a switching transistor Q5 which are connected back-to-back, the second inverter inductor is an inductor LA, and the second output capacitor is a capacitor C6; the switching transistor Q4, the switching transistor Q5, the switching transistor Q6 and the switching transistor Q7 form the split-phase inverter, the split-phase inverter is connected to the output terminal Va by means of the inductor LA, and the capacitor C6 is connected between the output terminal Va and the common terminal N.

In a second split-phase inverter branch, the fourth switching unit is a switching transistor Q12, the fifth switching unit is a switching transistor Q11, the sixth switching unit comprises a switching transistor Q9 and a switching transistor Q10 which are connected back-to-back, the second inverter inductor is an inductor LB, and the second output capacitor is a capacitor C7; the switching transistor Q9, the switching transistor Q10, the switching transistor Q11 and the switching transistor Q13 form the split-phase inverter, the split-phase inverter is connected to the output terminal Vb by means of the inductor LB, and the capacitor C7 is connected between the output terminal Vb and the common terminal N.

Specifically, the output terminal Va and the output terminal Vb can effectively keep the voltage of a positive half and the voltage of a negative half in balance, and the circuit principle is the same as that in Embodiment 5 and will not be repeated here.

According to the single-stage bidirectional DC converter and the single-phase user-side energy storage inverter based on a single-stage bidirectional DC converter, a DC bus side of the single-stage bidirectional DC converter is connected between photovoltaic MPPT and an inverter or connected to other loads, a low-voltage side of the single-stage bidirectional DC converter is connected to a battery, and the single-stage bidirectional DC converter has a simple topological structure and a few of components and reduces the equipment cost. A high-voltage side of the single-stage bidirectional DC converter may be connected in series to a single-phase inverter circuit, a half-bridge inverter circuit, a three-phase inverter circuit, a three-phase and three-level inverter circuit or a split-phase inverter circuit, and the neutral-point voltage can be balanced to keep an output bus voltage stable, such that the application scenarios of the user-side energy storage inverter are expanded. The circuit structure in the invention is easy to implement, low in cost and easy to popularize.

It should be noted that the above embodiments are merely preferred ones of the invention and are not used to limit the invention. For those skilled in the art, various transformations and modifications of the invention can be made. Any amendments, equivalent substitutions and improvements made based on the spirit and principle of the invention should also fall within the protection scope of the invention.

What is claimed is:

1. A single-phase user-side energy storage inverter based on a single-stage bidirectional DC converter, comprising a single-stage bidirectional DC and an inverter circuit connected to the single-stage bidirectional DC converter, wherein the single-stage bidirectional DC converter is used for bidirectional charge and discharge of a battery, and comprises a transformer T1, a bus-side circuit, a battery-side circuit and a controller, wherein the bus-side circuit is electrically connected to a primary side of the transformer T1, and the battery-side circuit is electrically connected to a secondary side of the transformer T1;

the bus-side circuit comprises at least one energy storage branch, each said energy storage branch comprises a bus-side switching transistor, the battery-side circuit comprises a battery-side switching transistor, the controller is used for controlling on/off of the bus-side switching transistor and the battery-side switching transistor, and the battery-side switching transistor and the bus-side switching transistor are turned on and off complementarily, wherein the bus-side circuit of the single-stage bidirectional DC converter comprises two energy storage branches, and the two energy storage branches are respectively connected to a positive terminal VBUS+ of the DC bus and a negative terminal VBUS− of the DC bus;

each said energy storage branch comprises a bus-side switching transistor, the battery-side circuit comprises a battery-side switching transistor, the controller is used for controlling on/off of the bus-side switching transistors and the battery-side switching transistor, the bus-side switching transistors are turned on and off synchronously, and the battery-side switching transistor and the bus-side switching transistors are turned on and off complementarily, wherein the two energy storage branches are a first energy storage branch and a second energy storage branch respectively, the first energy storage branch and the second energy storage branch are respectively connected to the dotted terminal and the undotted terminal of the primary winding of the transformer T1, and a center tap of the primary winding of the transformer T1 is grounded; the first energy storage branch comprises an inductor L1_A, a third capacitor C3 and a first switching transistor Q1, and the second energy storage branch comprises an inductor L1_B, a fourth capacitor C4 and a second switching transistor Q2;

the inductor L1_A and the third capacitor C3 are connected in series and then connected between the dotted terminal of the primary winding of the transformer T1 and the positive terminal VBUS+ of the DC bus, a drain of the first switching transistor Q1 is connected to a midpoint between the inductor L1_A and the third capacitor C3, and a source of the first switching transistor Q1 is connected to the center tap of the primary winding of the transformer T1 and is grounded;

the inductor L1_B and the fourth capacitor C4 are connected in series and then connected between the undotted terminal of the secondary winding of the transformer T1 and the negative terminal VBUS− of the DC bus, a source of the second switching transistor Q2 is connected to a midpoint between the inductor L1_B and the fourth capacitor C4, and a drain of the second switching transistor Q2 is connected to the center tap of the primary winding of the transformer T1 and is grounded;

a first capacitor C1 and a second capacitor C2 are respectively connected between the positive terminal VBUS+ of the DC bus and the center tap of the primary winding of the transformer T1 as well as between the negative terminal VBUS− of the DC bus and the center tap of the primary winding of the transformer T1.

2. The single-phase user-side energy storage inverter based on a single-stage bidirectional DC converter according to claim 1, wherein the battery-side circuit comprises a third switching transistor Q3, a drain of the third switching transistor Q3 is connected to the undotted terminal of the secondary winding of the transformer T1, a source of the third switching transistor Q3 is grounded, the dotted terminal of the secondary winding of the transformer T1 is connected to the positive terminal VBAT of the battery, and a fifth capacitor C5 is connected between the dotted terminal of the secondary winding of the transformer T1 and the ground wire.

3. The single-phase user-side energy storage inverter based on a single-stage bidirectional DC converter according to claim 1, wherein the inverter circuit is a single-phase inverter circuit, and the single-phase inverter circuit comprises a switching transistor Q4, a switching transistor Q5, a switching transistor Q7, a switching transistor Q8, an inductor L3 and an inductor L4;

the switching transistor Q4, the switching transistor Q5, the switching transistor Q7 and the switching transistor Q8 form two inverter bridges, which are connected between the positive terminal VBUS+ of the DC bus and the negative terminal VBUS− of the DC bus, and the inductor L3 and the inductor L4 are respectively connected between arms of the two inverter bridges and input power lines V_L and V_N.

4. The single-phase user-side energy storage inverter based on a single-stage bidirectional DC converter according to claim 1, wherein the inverter circuit is a half-bridge inverter circuit, and the half-bridge inverter circuit comprises a capacitor C6, a capacitor C7, a switching transistor Q4, a switching transistor Q7, an inductor L3 and inductor L4;

the capacitor C6 and the capacitor C7 are connected in series and then connected between the positive terminal VBUS+ of the DC bus and the negative terminal VBUS− of the DC bus, the switching transistor Q4 and the switching transistor Q7 are connected in series and then connected between the positive terminal VBUS+ of the DC bus and the negative terminal VBUS− of the DC bus, two terminals of the inductor L4 are respectively connected to a midpoint between the capacitor C6 and the capacitor C7 and an input power line V_N, and two terminals of the L3 are respectively connected to a midpoint between the switching transistor Q4 and the switching transistor Q7 and an input power line V_L.

5. The single-phase user-side energy storage inverter based on a single-stage bidirectional DC converter according to claim 1, wherein the inverter circuit is a three-phase inverter circuit, and the three-phase inverter circuit comprises a fourth switching transistor Q4, a fifth switching transistor Q5, a sixth switching transistor Q6, a seventh switching transistor Q7, an eighth switching transistor Q8, a ninth switching transistor Q9, a third inductor L3, a fourth inductor L4 and a fifth inductor L5;

the fifth switching transistor Q5, the sixth switching transistor Q6, the seventh switching transistor Q7, the eighth switching transistor Q8 and the ninth switching transistor Q9 form three inverter bridges, which are connected in parallel between the positive terminal VBUS+ of the DC bus and the negative terminal VBUS− of the DC bus, and the inductor L3, the inductor L4 and the inductor L5 are respectively connected between arms of the three inverter bridges and input power lines VA, VB and VC.

6. The single-phase user-side energy storage inverter based on a single-stage bidirectional DC converter according to claim 1, wherein the inverter circuit is a three-phase and three-level inverter circuit, the three-phase and three-level inverter circuit comprises three three-level inverter branches which are connected in parallel, and a phase difference between the three three-level inverter branches is 120°; each said three-level inverter branch comprises a T-type three-level inverter, a first inverter inductor and a first output capacitor, the T-type three-level inverter comprises a first switching unit, a second switching unit and a third switching unit which are connected in a T shape, the first switching unit and the second switching unit are connected in series and then connected between the positive terminal VBUS+ of the DC bust and the negative terminal VBUS− of the DC bus, the third switching unit is connected between a center tap of the transformer T1 and a midpoint between the first switching unit and the second switching unit, the midpoint between the first switching unit and the second switching unit is connected to a first output terminal by means of the first inverter inductor, and a second output terminal is connected to the negative terminal VBUS− of the DC bus;

- wherein, the third switching unit comprises a pair of switching transistors which are connected back-to-back;
- the first output capacitor is connected between the first output terminal and the second output terminal.

7. The single-phase user-side energy storage inverter based on a single-stage bidirectional DC converter according to claim 1, wherein the inverter circuit is a split-phase inverter circuit, the split-phase inverter circuit comprises two split-phase inverter branches which are connected in parallel back-to-back, and a preset phase difference is set between the two split-phase inverter branches; each said split-phase inverter branch comprises a split-phase inverter, a second inverter inductor and a second output capacitor, the split-phase inverter comprises a fourth switching unit, a fifth switching unit and a sixth switching unit which are connected in a T shape, the fourth switching unit and the fifth switching unit are connected in series and then connected between the positive terminal VBUS+ of the DC bus and the negative terminal VBUS− of the DC bus, the sixth switching unit is connected between a center tap of the transformer T1 and a midpoint between the fourth switching unit and the fifth switching unit, the midpoint between the fourth switching unit and the fifth switching unit is connected to a first output terminal by means of the second inverter inductor, and a second output terminal is connected to the negative terminal VBUS− of the DC bus;

- wherein, the sixth switching unit comprises a pair of switching transistors which are connected back-to-back;
- the second output capacitor is connected between the first output terminal and the second output terminal.

* * * * *